United States Patent [19]

Hamer et al.

[11] Patent Number: 5,019,218
[45] Date of Patent: May 28, 1991

[54] VACUUM DISTILLATION PROCESS

[75] Inventors: Johannes A. Hamer; Pieter van der Heijden, both of The Hague, Netherlands

[73] Assignee: Shell Oil Company, Houston, Tex.

[21] Appl. No.: 476,183

[22] Filed: Feb. 7, 1990

[30] Foreign Application Priority Data

Feb. 10, 1989 [GB] United Kingdom ............... 8903011

[51] Int. Cl.$^5$ .................................................. B01D 3/10
[52] U.S. Cl. .................................. 203/87; 202/186; 202/199; 202/205; 203/94; 203/98; 203/99; 203/DIG. 9; 203/DIG. 19; 208/308
[58] Field of Search ............ 203/87, 91, 94, 98, 203/99, DIG. 9, DIG. 19; 208/308; 159/47.1, 901, DIG. 16, DIG. 32, DIG. 23; 202/186, 199, 205

[56] References Cited

U.S. PATENT DOCUMENTS

| | | | |
|---|---|---|---|
| 1,854,002 | 4/1932 | Subkow | 203/87 |
| 2,224,986 | 12/1940 | Potts et al. | 203/87 |
| 2,646,392 | 7/1953 | Gerhold | 261/148 |
| 2,805,981 | 9/1957 | Cavin et al. | 203/87 |
| 2,885,354 | 5/1959 | Myers | 208/358 |
| 2,901,425 | 8/1959 | Waddill | 208/358 |
| 4,834,868 | 5/1989 | Lappin | 208/357 |
| 4,894,145 | 1/1990 | Jensen | 208/355 |

FOREIGN PATENT DOCUMENTS

1333688 8/1987 U.S.S.R. .......................... 208/355

*Primary Examiner*—Virginia Manoharan
*Attorney, Agent, or Firm*—Ronald R. Reper

[57] ABSTRACT

Improved hydrocarbon vacuum distillation process wherein the process steps include introducing a feed which contains liquid hydrocarbons and vaporous hydrocarbons into an inlet section (3) of a distillation column (1) operating at a subatmospheric pressure, removing liquid from a bottom section (6) of the distillation column (1), allowing vapor to pass through three condensation sections (13b, 13a and 13) arranged above each other in the distillation column (1) between the inlet section (3) and a top section (8), removing vapor from the top section (8), spraying into each condensation section (13, 13a and 13b) cooled liquid, and removing liquid from each condensation section (13, 13a and 13b), wherein the cooled liquid which is sprayed into each condensation section (13, 13a and 13b) includes liquid removed from that condensation section (13, 13a and 13b), and wherein the cooled liquid which is sprayed in the uppermost condensation section (13) further includes liquid removed from the condensation sections (13a, 13b) arranged below the uppermost condensation section (13).

2 Claims, 1 Drawing Sheet

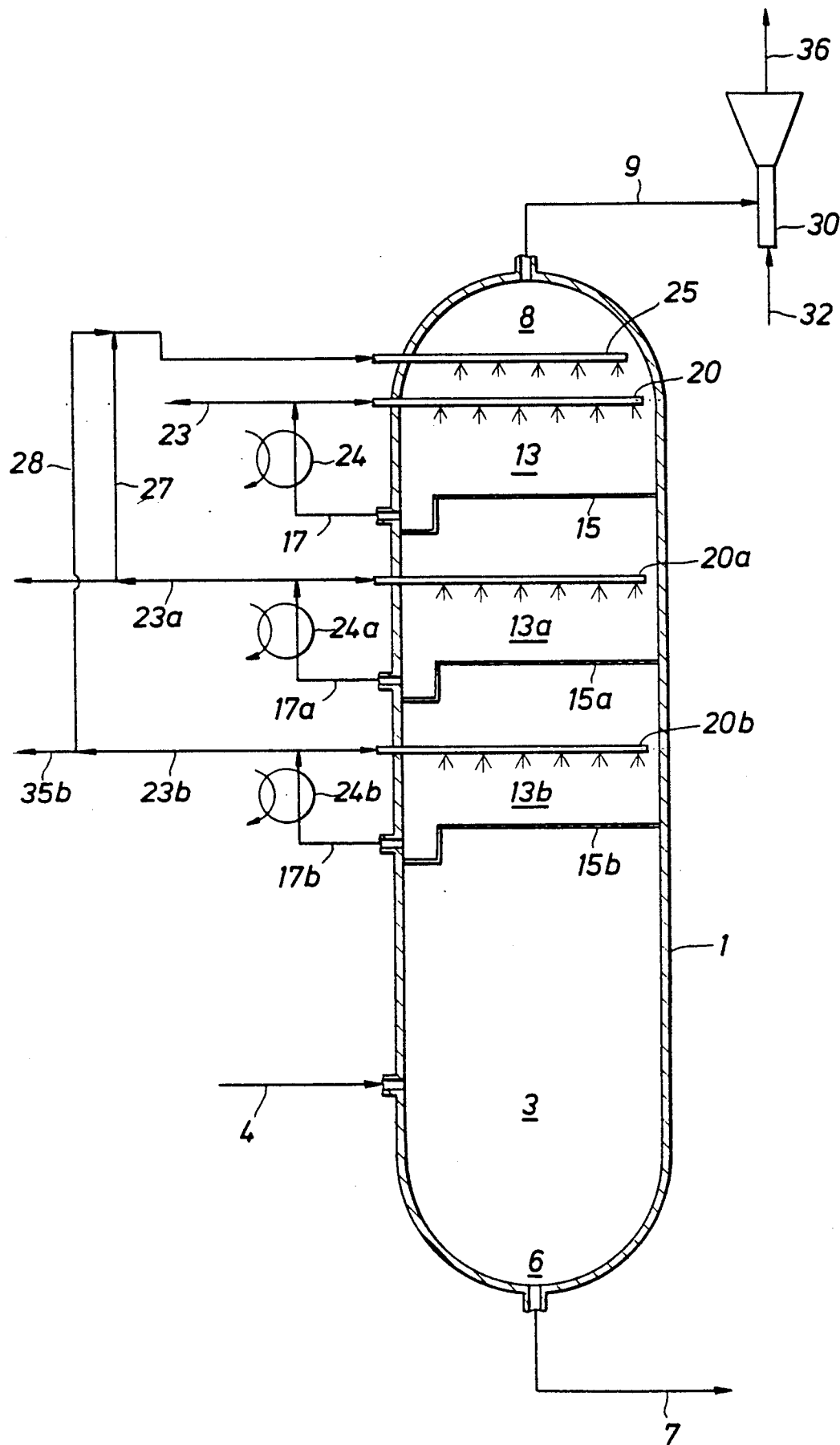

VACUUM DISTILLATION PROCESS

BACKGROUND OF THE INVENTION

The present invention relates to a vacuum distillation process. The process is particularly suited for distilling a feed containing hydrocarbons, which feed has a temperature in the range of from 380° to 425° C., at a subatmospheric pressure in the range of from 650 to 5 200 Pa. The feed is sometimes referred to as long residue.

Such a vacuum distillation process comprises introducing a preheated feed which contains liquid and vapor into an inlet section of an upright distillation column operating at a subatmospheric pressure, removing liquid from a bottom section of the distillation column, allowing vapor to pass through at least two condensation sections arranged above each other in the distillation column between the inlet section and a top section, removing vapor from the top section, spraying into each condensation section cooled liquid, and removing liquid from each condensation section, wherein the cooled liquid which is sprayed into each condensation section comprises liquid removed from that condensation section.

The cooled liquid sprayed into each condensation section is sprayed into the vapor passing through the condensation section. As a result part of the vapor is condensed and this part is removed from the distillation column with the liquid removed from the condensation section.

The remaining vapor is removed from the top, uppermost section by vacuum, e.g., vacuum pump and more preferably a steam ejector. It was found that this vapor still contained a considerable amount of valuable hydrocarbon components.

It is an object of the present invention to provide a vacuum distillation process wherein the vapor removed from the top section contains only a small amount of valuable hydrocarbon components.

SUMMARY OF THE INVENTION

To this end the vacuum distillation process according to the present invention comprises introducing a preheated feed which contains liquid and vapor into an inlet section of an upright distillation column operating at a subatmospheric pressure, removing liquid from a bottom section of the distillation column, allowing vapor to pass through at least two condensation sections arranged above each other in the distillation column between the inlet section and a top section, removing vapor from the top section, spraying into each condensation section cooled liquid, and removing liquid from each condensation section, wherein the cooled liquid which is sprayed into each condensation section comprises liquid removed from that condensation section, and wherein the cooled liquid which is sprayed in the uppermost condensation section further comprises liquid removed from the condensation section(s) arranged below the uppermost condensation section.

BRIEF DESCRIPTION OF THE DRAWING

The invention will now be described by way of example in more detail with reference to the enclosed drawing which shows schematically a longitudinal section of a vacuum distillation column in accordance with the invention.

DESCRIPTION OF PREFERRED EMBODIMENT

The vacuum distillation column 1 includes an inlet section 3 into which feed supply conduit 4 debouches, a bottom section 6 provided with outlet conduit 7 and a top section 8 provided with top outlet conduit 9.

Three condensation sections are disposed above each other in the vacuum distillation column 1 between the inlet section 3 and the top section 8. The uppermost condensation section is referred to with reference numeral 13, the first condensation section arranged below the uppermost condensation section 13 is referred to with reference numeral 13a, and the second condensation section arranged below the uppermost condensation section 13 is referred to with reference numeral 13b.

Each condensation section 13, 13a and 13b is provided with a draw-off tray referred to with reference numerals 15, 15a and 15b, a draw-off conduit 17, 17a and 17b, a sprayer 20, 20a and 20b, and an outlet conduit 23, 23a and 23b. Each draw-off conduit 17, 17a and 17b is provided with a cooler 24, 24a and 24b.

The uppermost condensation section 13 is furthermore provided with an additional sprayer 25. Connecting line 27 connects the additional sprayer 25 to the outlet conduit 23a pertaining to the first condensation section arranged below the uppermost condensation section 13a and connecting line 28 connects the additional sprayer 25 to the outlet conduit 23b pertaining to the second condensation section arranged below the uppermost condensation section 13b.

The top outlet conduit 9 is connected to a vacuum pump in the form of steam ejector 30 provided with a steam supply line 32 and an outlet line 36.

During normal operation, a preheated feed which contains liquid hydrocarbons and vaporous hydrocarbons is introduced at a temperature in the range of from 380° to 425° C. through feed supply conduit 4 into the inlet section 3 of the distillation column 1. On entering the inlet section 3 liquid drops out of the stream and is collected in the bottom section 6 of the distillation column 1 from which it is removed through outlet conduit 7.

Vapor is allowed to pass through the three condensation sections 13b, 13a and 13.

In condensation section 13b cooled liquid having a temperature of from 200° to 280° C. is sprayed into the vapor passing through the condensation section 13b. As a result part of the vapor condenses and is collected on the draw-off tray 15b. The liquid is removed from the distillation column 1 through draw-off conduit 13b and is cooled in cooler 24b. A first part of the removed liquid is supplied to sprayer 20b, a second part of the removed liquid is supplied through conduit 28 to sprayer 25 and the balance is removed as a product through conduit 35b.

In condensation section 13a cooled liquid having a temperature of from 150° to 230° C. is sprayed into the vapor, condensed vapor is collected on the draw-off tray 15a, is removed therefrom through draw-off conduit 13a and is cooled in cooler 24a. A first part of the removed liquid is supplied to sprayer 20a, a second part of the removed liquid is supplied through conduit 27 to sprayer 25 and the balance is removed as a product through conduit 35a.

In condensation section 13 cooled liquid having a temperature of from 60° to 150° C. is sprayed as well into the vapor, condensed vapor is collected on the draw-off tray 15, is removed therefrom through draw-off conduit 13 and is cooled in cooler 24. Part of the removed liquid is supplied to sprayer 20 and the balance is removed as a product through conduit 23.

In addition to the cooled liquid sprayed through sprayer 20 in the vapor passing through the uppermost condensation section 13, additional cooled liquid having a temperature of from 60° to 150° C. is sprayed therein through sprayer 25. The additional liquid together with vapor absorbed in it is removed from the column 1 through conduit 17, and part thereof is removed as a product through conduit 23.

The vapor fraction which is not removed in a condensed form from the condensation sections 13, 13a and 13b is removed from the top section 8 of the column 1 through top outlet conduit 9 by the action of steam ejector 30. In doing so the steam ejector maintains the pressure in the distillation column 1 at the subatmospheric pressure.

It was found that the additional cooled liquid sprayed through sprayer 25 absorbed hydrocarbon vapor which would otherwise be removed from the column 1 through outlet conduit 9.

The amount of additional liquid is so selected that the amount of valuable hydrocarbons in the vapor fraction which is removed by means of the vacuum pump is minimized. Suitably the cooled liquid sprayed into the vapor passing through the uppermost condensation section comprises between 0.5 and 1 kg of liquid removed from the condensation section(s) arranged below the uppermost condensation section per kg of liquid removed from the uppermost condensation section.

What is claimed is:

1. Vacuum distillation process comprising introducing a preheated feed which contains liquid and vapor into an inlet section of an upright distillation column operating at a subatmospheric pressure, said column having a top section disposed at the uppermost part thereof and a bottom section disposed at the lowermost part thereof, said inlet section being disposed between said top section and said bottom section; removing liquid from said bottom section of the distillation column, allowing vapor to pass through at least two condensation sections disposed one above the other in the distillation column between said inlet section and said top section; withdrawing vapor from the top section; spraying into each condensation section liquid having a temperature below that of the vapor in each said condensation section, and removing liquid from each condensation section, wherein the liquid which is sprayed into each condensation section comprises liquid removed from that condensation section which has been cooled by indirect heat exchange, and wherein the cooled liquid which is sprayed in the uppermost condensation section comprises at least part of the liquid removed from the condensation section disposed below the uppermost condensation section, and wherein the cooled liquid sprayed into the vapor passing through the uppermost condensation section comprises between 0.5 and 1 kg of liquid removed from at least one condensation section disposed below the uppermost condensation section per kg of liquid removed from the uppermost condensation section.

2. Vacuum distillation process as in claim 1, wherein said column vapor is passed through three condensation sections, and wherein the cooled liquid which is sprayed in the uppermost condensation section includes liquid removed from both condensation sections disposed below the uppermost condensation section.

* * * * *